Jan. 3, 1967    D. H. BROOKS    3,295,494
FLUIDIZED BED APPARATUS FOR COATING THE INTERIOR OF HOLLOW BODY
Filed April 16, 1959    2 Sheets-Sheet 1
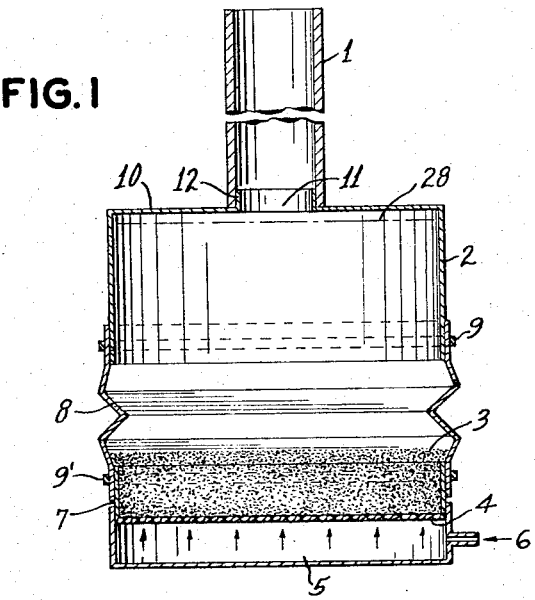
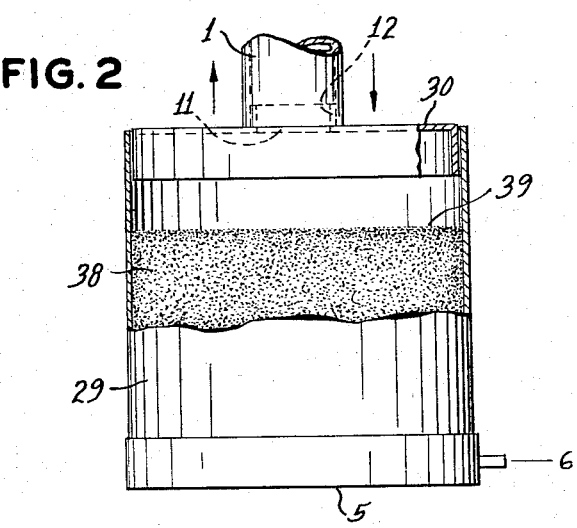
INVENTOR.
DONALD HERBERT BROOKS
BY Karl Huber
James E. Bryan
Alan C. Rose
ATTORNEYS Jan. 3, 1967  D. H. BROOKS  3,295,494
FLUIDIZED BED APPARATUS FOR COATING THE INTERIOR OF HOLLOW BODY
Filed April 16, 1959  2 Sheets-Sheet 2
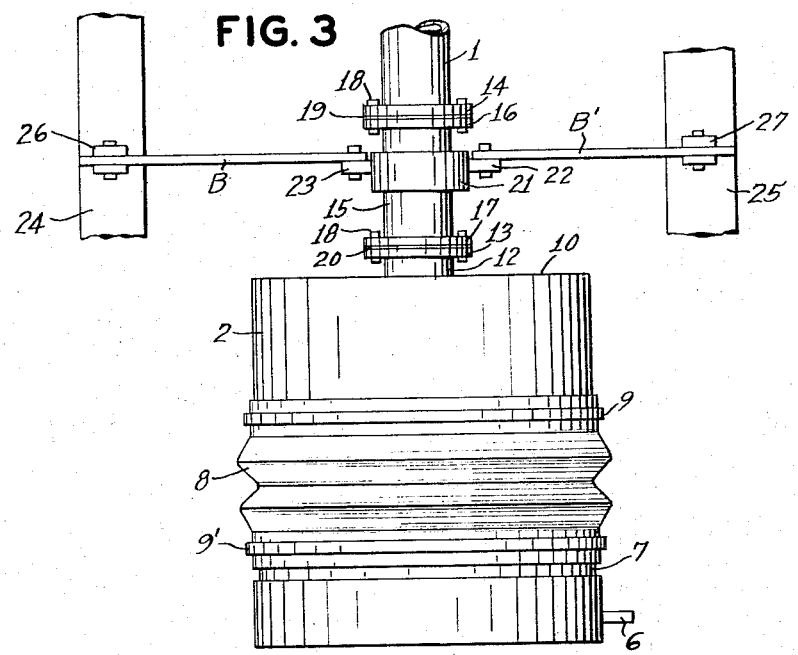
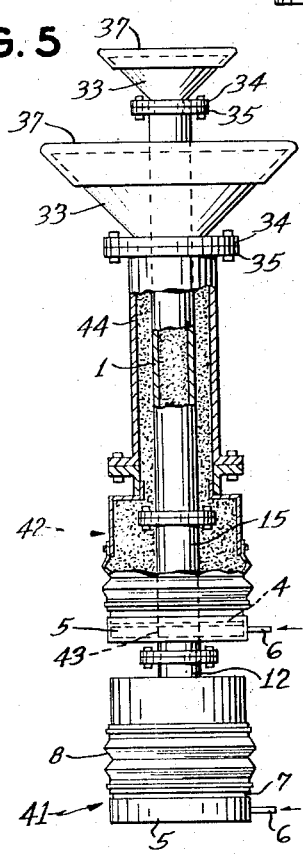
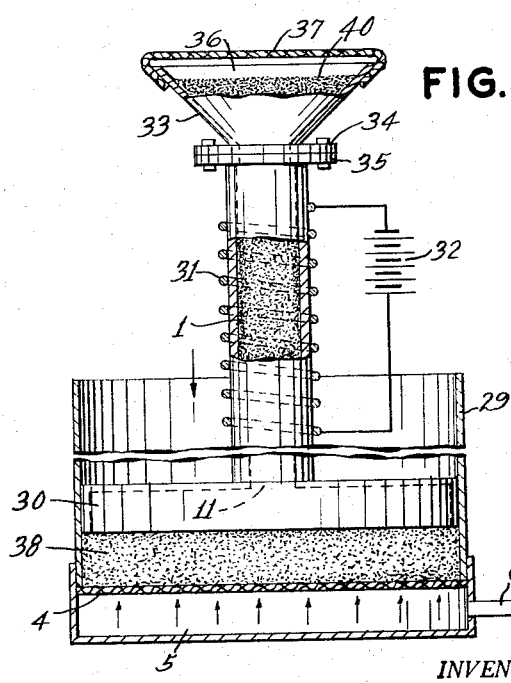
INVENTOR.
DONALD HERBERT BROOKS
BY Karl Huber
James E. Bryan
Valan C. Rose
ATTORNEYS United States Patent Office 3,295,494
Patented Jan. 3, 1967

1

3,295,494
FLUIDIZED BED APPARATUS FOR COATING THE INTERIOR OF HOLLOW BODY
Donald Herbert Brooks, Johannesburg, Republic of South Africa, assignor, by mesne assignments, to International Protected Metals, Inc., a corporation of New Jersey
Filed Apr. 16, 1959, Ser. No. 806,931
Claims priority, application Republic of South Africa, Sept. 25, 1958, 3,382/58
2 Claims. (Cl. 118—408)

The present invention relates to an apparatus for applying plastic coatings and more particularly to an apparatus for applying plastic coatings especially to elongated articles.

In the art of applying plastic coatings to articles, several different coating methods are known including the method of spraying liquid plastic material onto the article, the method of spraying pulverized or powdered plastic material onto a heated object, the method of passing a circulatory stream of plastic particles into contact with a heated article, and the method of contacting the article to be coated, while in a heated state, by immersing the article into a fluidized bed of plastic particles.

An example of the method of passing a circulatory stream of plastic particles into contact with a heated article is disclosed in U.S. Patent No. 2,719,093.

An example of the method of contacting a heated article by immersing it into a fluidized bed of plastic particles is disclosed in U.S. Patent No. 2,844,489.

The present invention relates to the coating of articles by a fluidized process especially applicable to elongated articles such as I-beams, girders, valves, cylinders and tubes or pipes, whereby the elongated articles are easily and economically coated with a plastic layer either externally, internally or externally and internally thereof. The invention includes the combination of the steps of fluidizing a bed of plastic particles to optimum fluidity such that the fluidized particles are substantially in a state of equilibrium and then vertically motivating or elevating the fluidized bed while still in a state of equilibrium by varying the capacity of the bed container. The term "equilibrium" as herein employed means that the fluidized powder bed is in an optimum fluid state and still maintains a distinctly defined fluid surface during its vertical movement. During its vertical movement, the fluidized plastic particles are caused to contact the surfaces of the heated article supported above the container of the fluidized bed.

It is an object of the present invention to provide a method and apparatus for easily and economically coating articles with a layer of plastic material.

It is another object of the invention to provide a method and apparatus for coating elongated articles with a plastic layer by vertically displacing a fluidized bed of plastic particles.

It is a further object of the present invention to provide a method and apparatus for internally coating pipes and tubes with a plastic lining by vertically displacing a fluidized bed of plastic particles into the pipe or tube.

Other objects and advantages of the invention will become apparent from the description hereinafter following and the drawings forming a part hereof, in which:

FIGURE 1 illustrates a cross-sectional view of an apparatus for internally coating a tubular member with a plastic layer.

FIGURE 2 illustrates a partly cross-sectional and partly elevational view of a modification of the apparatus of FIGURE 1, FIGURE 3 illustrates a modified elevational view of FIGURE 1 and including means for supporting the apparatus,

2

FIGURE 4 illustrates a cross-sectional view of a modification of the apparatus of FIGURE 2 showing relative movement of the components thereof, and FIGURE 5 illustrates a partly elevational and partly cross-sectional view of an apparatus of the invention for coating external and internal surfaces of a tubular member.

In accordance with this invention a pipe or the like is internally lined by heating it and connecting it to the upper portion of a tank containing fluidized thermoplastic material and thereafter reducing the volume available to the fluidized material in the tank so that it is forced to flow up the interior of the pipe.

In addition to coating the interior surfaces of pipes, the invention also contemplates coating the external surfaces of pipes or solid elongated articles as hereinafter more particularly described.

The form of apparatus for carrying out this invention comprises a normal fluidizing tank mounted on an upwardly movable base for varying the volume thereof or having a piston-like member associated therewith for varying the tank volume.

In the first-mentioned form the top of the tank is fitted with a cover having a central hole communicating with a connector in the form of a vertical length of pipe flanged at its top end and provided with an asbestos or other heat insulating gasket.

This connector is held rigidly over the top of the fluidizing tank by a brace means or bracket which is sufficiently robust to enable the connector to support the length of the pipe to be lined.

Assuming the latter is a flanged pipe it is placed vertically on the connector with its lower flange resting on the gasket. A vessel in the form of an inverted cone having a bottom flanged outlet is fitted on the top of the pipe to be lined. The flanges of the vessel and top of the pipe are placed in registration so that the two members communicate with each other. A further heat insulating gasket is fitted between the flanges. The top of the conical vessel is covered by a filter cloth sufficiently fine to prevent any substantial escape of fluidized powder through it.

To effect the lining of the pipe prior to and/or after it has been positioned between the connector and the conical vessel, it is heated. Thereafter, thermoplastic powder in the fluidizing tank is fluidized by an air flow in the normal way and the base and tank then raised vertically relative to the cover. Since the cover remains stationary, the volume available in the tank becomes less than the volume of the fluidized mass of powder so that the latter will be constrained to flow up the bore of the pipe. Due to the temperature of the pipe, part of the powder will become plastic and adhere to the internal wall of the pipe to form a lining therefor. Thereafter the tank is lowered to allow the remaining fluidized powder to return thereto.

The whole coating operation may be carried out in a matter of seconds, i.e., rapidly, the time required varying depending on the temperature of the pipe, the thickness of coating required and the type of thermoplastic powder used. Examples of suitable powders are polyethylene and nylon synthetic resin powders.

To ensure a lining of the full length of the pipe the tank is raised sufficiently to ensure that the fluidized powder flows into the top conical vessel. As both the latter and the connector are heat insulated from the pipe there will be no substantial deposition of plastic material in these members.

The lifting of the fluidizing tank may be effected in any suitable way such as by a hand operated lever or by a motor operated mechanism. The volume of the tank may be varied to suit the size of the pipe to be lined but must obviously be greater than the volume of the pipe.

Where plain ended pipes are to be lined the flanges on the top vessel and connector may be replaced by coned insulating members into which the ends of pipes of varying diameter may fit.

The basic requirement for transport of the fluidized powder into the pipe is that the volume available to the powder in the tank should be variable. It is clear that this requirement may be met in different ways such as providing a tank with collapsible or concertine type sides or by moving the cover connector, pipe and top vessel assembly relative to the tank.

It is sometimes desirable to deposit layers of different fluidized material in the pipe so as to form a laminated lining. This may be effected by the use of branched and valve controlled connectors connecting one pipe to different fluidizing tanks from which the fluidized contents are conveyed to the pipe in turn. Thus for example by this method a thermoplastic material may be deposited in the pipe and while it is still tacky a layer of glass flakes, beads or fibres deposited as a reinforcing and/or protective layer on the tack material.

Alternatively a single fluidizing tank may be connected by a branched and valve controlled connector to different pipes which will enable the setting up of one pipe to be effected while another is being lined.

With any of the embodiments of the invention described above, it may be desirable, prior to application of the fluidized material, to apply a very thin bonding coat of thermoplastic material. This may be done with the pipe in position over the fluidizing tank by conveying the bonding material in powder form in an air stream projected through the connector.

In accordance with FIGURES 1 and 3 of the invention, a pipe 1, or the like, is internally lined by preheating it and connecting it to the upper portion of a tank 2 containing a bed 3 of thermoplastic particles or powder, such as powders of polyethylene, polypropylene, nylon, a vinyl, or a cellulosic material. The bed 3 may also be composed of plastic thermosetting powder material such as powders of epoxy resins, polyesters, phenolics, etc. The bed 3 may also be composed of metal powders such as lead, tin, etc., or powders of glass-like materials, e.g. glass, which becomes plastic with the application of suitable temperatures. Also, the invention contemplates the powder mixtures composed of at least one powder which is capable of fusion with the application of heat, e.g. a plastic powder mixed with a ceramic powder. The bottom 4 of the container 2 in direct contact with the powder bed is a porous filter composed, for example, of woven or non-woven fabric, or a disc of compacted and sintered metal powder permeable to the passage of air or gas therethrough and is encased by or otherwise communicates with an air or gas chamber 5 having an inlet means 6.

In order to render the tank 2 capable of reducing and expanding its volume, the base 7 of the tank is vertically movable in relation to the upper portion of the tank by means of a flexible member 8, e.g. a bellows, joining the base 7 with the tank upper portion by bands 9 and 9' and forming wall portions of the tank. The top of the tank is provided with a cover 10 having a substantially central aperture 11 formed therethrough with an annular seat 12 mounted on cover 10 around the aperture 11 and extending upwardly of the aperture.

FIGURE 3 shows a modification of FIGURE 1 in that the annular seat 12 is provided with an upper flange 13, the pipe 1 is provided with a terminal flange 14 and a pipe 15 having terminal flanges 16 and 17 is interposed between the annular seat 12 and pipe 1 by means of bolts 18 interconnecting the mating flanges. Heat insulating gaskets 19 and 20, e.g. asbestos gaskets, are positioned and secured between the flanges. A collar 21 having diametrically opposed ears or lugs 22 and 23 is mounted circumferentially of the pipe 15, and braces B and B' are secured to the lugs, whereby the braces are fixed to a pair of laterally spaced supports by means of clamps 26 and 27, or the like. The entire assembly illustrated by FIGURE 3 is mounted between the supports 24 and 25.

In operation, according to FIGURE 1, pressurized air or gas is introduced to the chamber 5 through inlet 6. The pressurized air passes through the filter 4 and fluidizes the powder bed 3, with the expanded fluidized masss maintaining a distinct fluid surface and the bed of particles being expanded vertically in the tank 2 with the expanded fluidized powder bed having a surface level as at 28. Thereafter, the base 7 of the tank 2 is raised vertically and reduces the effective volume of the tank 2 causing the surface level of the fluidized powder bed to rise rapidly upwardly within the pipe. Essentially, the tank diameter is greater than the pipe diameter and a small vertical movement of the base 7 causes a proportionally greater vertical rise of the fluid level within the pipe 1, whereby substantially long pipes can be filled with a fluidized powder mass. Prior to raising the fluidized bed level 28 into pipe 1, the pipe is heated. The powdered plastic particles which contact the inner surface of the heated pipe become fused thereto and form an effective plastic lining for the pipe.

In general, even a short contact period e.g. 5 seconds with the heated pipe is sufficient to provide an adequate plastic layer to the inner surface of the pipe. Consequently, it is normally sufficient to rapidly raise the base 7 of the tank 2 for a short time and then rapidly lower the base 7, whereby the fluidized particles which do not become fused are returned to the tank 2. However, under certain conditions, raising and lowering of the bed may be repeated, or the fluidized particles may be maintained inside the pipe for longer periods.

FIGURES 2 and 4 illustrate a modification of the invention, partly with respect to the method of varying the tank capacity and partly with respect to the method of heating the pipe to be internally coated.

Regarding FIGURE 2, the tank is in the form of a hollow cylinder 29 and the cover 10, as illustrated in FIGURES 1 and 3, is replaced with a piston member 30 vertically movable along the inner walls of the cylinder 29. All other identical structural components bear identical reference numerals to identical parts illustrated in FIGURES 1 and 3.

Regarding FIGURE 4, the pipe 1 is provided with a resistance heating coil 31 in thermal contact with the pipe 1 and energized by a source of electrical energy 32. An inverted hollow cone-shaped member 33 is secured to the top of pipe 1, for example, by means of flanges 34 and 35. The larger opening 36 of the inverted cone is covered with a filter 37.

In operation, according to FIGURES 2 and 4, the coil 31 is energized to heat the pipe 1. Thereafter, the piston member 30, supporting the pipe 1, is lowered into the fluidized powder mass 38, whereupon the capacity of tank 29 is reduced with the fluid surface level 39 of tank 29 rising into the pipe 1 to reach its new surface level 40, as illustrated by FIGURE 4. Otherwise, the coating procedure is identical to that described with respect to FIGURES 1 and 3.

Regarding FIGURE 5, the apparatus of the invention is modified to provide either for the external coating of an elongated article, or for both the external and internal coating of an article should it be in the form of a tube.

For example, when it is required to coat both external and internal surfaces of a pipe, one surface with one type of plastic layer and the other surface with a different type of plastic layer, the apparatus comprises a first and second tank 41 and 42, with the first tank 41 and its associated operative components being substantially identical to that illustrated by tank 2 of FIGURE 3. The second tank 42 is provided with an aperture 43 through the air chamber 5 and with the tubular or pipe section 15, as illustrated by FIGURE 3, substantially hermetically sealed through the aperture 43 by known sealing methods and which pipe 15 also passes through the filter 4. The second tank 41 and its associated assembly is similar to the construction of FIGURE 1, except that the pipe 44 and pipe 1 are concentrically spaced from each other. It will be apparent from FIGURE 5 that the tanks 41 and 42 are independently operable for the raising and lowering of their respective fluidized powder beds along the lines hereinbefore described when operating as single units. However, the interiors of the pipes 1 and 44 may be operated from a single tank with a suitable by-pass system for simultaneously filling pipes 1 and 44 with the fluidized bed of particles when the coatings on both inner and outer surfaces are of identical composition. It is apparent that the tank 40 may be dispensed with when the article is an elongated solid for externally coating such solid article as long as the article is supported within the pipe 44.

While the invention has been described specifically with respect to the illustrations, various modifications are contemplated within the scope of the appended claims.

What is claimed is:

1. Apparatus for coating the interior of a hollow elongate body having opposite end openings, comprising a receptacle, a gas pervious partition dividing the receptacle into upper and lower chambers, said partition being adapted to support a body of pulverulent fluidizable material in the upper chamber, means for admitting a gas into the lower chamber for passage through the partition into and through the material in the upper chamber to fluidize the material, said receptacle in the portion thereof forming the upper chamber comprising an upper part and a lower part telescopically joined together whereby the upper part may have up-and-down movement relative to the lower part, means for effecting said up-and-down movement, the said upper part having a top outlet, and means for securing one open end of a hollow body to said upper part in communication with said outlet.

2. The invention according to claim 1, wherein the said means for admitting a gas into the lower chamber includes a valved pipe for regulating the admission of such gas under pressure from a source of supply, and a dust collecting hood over and in vertically spaced relation with the outlet of said upper part of the upper chamber.

References Cited by the Examiner

UNITED STATES PATENTS

| | | | |
|---|---|---|---|
| 2,178,158 | 10/1939 | Aulbach | 118—421 X |
| 2,815,550 | 12/1957 | Valyi. | |
| 2,844,489 | 7/1958 | Gemmer | 117—22 X |
| 2,907,299 | 10/1959 | Weimer | 118—309 |
| 2,969,038 | 1/1961 | Neumann. | |
| 2,974,060 | 3/1961 | Dettling et al. | |
| 2,987,413 | 6/1961 | Dettling et al. | 118—429 |
| 3,002,231 | 10/1961 | Walker et al. | |
| 3,004,861 | 10/1961 | Davis. | |
| 3,063,860 | 11/1962 | Gemmer. | |
| 3,093,510 | 6/1963 | Olson et al. | 117—21 X |
| 3,138,483 | 6/1964 | Dettling et al. | |

FOREIGN PATENTS 1,051,175   2/1959   Germany.

WILLIAM D. MARTIN, *Primary Examiner.*

RICHARD D. NEVIUS, JOSEPH B. SPENCER,
*Examiners.*

R. E. ZIMMERMAN, M. KAPLAN, P. ATTAGUILE,
*Assistant Examiners.*